(12) United States Patent
Tsuboi

(10) Patent No.: US 7,602,535 B2
(45) Date of Patent: Oct. 13, 2009

(54) IMAGE PROCESSING APPARATUS AND IMAGE TRANSMITTING METHOD

(75) Inventor: Tomo Tsuboi, Itami (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 870 days.

(21) Appl. No.: 11/023,619

(22) Filed: Dec. 29, 2004

(65) Prior Publication Data

US 2006/0039036 A1   Feb. 23, 2006

(30) Foreign Application Priority Data

Aug. 17, 2004   (JP) .............................. 2004-237621

(51) Int. Cl.
*H04N 1/04* (2006.01)
*H04N 1/00* (2006.01)

(52) U.S. Cl. ................... 358/474; 358/400; 358/403

(58) Field of Classification Search ........... 358/403, 358/474, 444, 404, 443, 2.1, 1.16, 1.18, 400, 358/407
See application file for complete search history.

(56) References Cited

U.S. PATENT DOCUMENTS

| 5,933,584 | A | * | 8/1999 | Maniwa | 358/1.15 |
| 6,021,307 | A | * | 2/2000 | Chan | 725/110 |
| 6,360,280 | B1 | * | 3/2002 | Jones | 719/328 |
| 6,470,152 | B2 | * | 10/2002 | Saito et al. | 396/311 |
| 6,608,696 | B1 | * | 8/2003 | Iimoto et al. | 358/1.15 |
| 2002/0146256 | A1 | * | 10/2002 | Sekiguchi et al. | 399/82 |
| 2004/0059740 | A1 | * | 3/2004 | Hanakawa et al. | 707/100 |
| 2005/0018242 | A1 | * | 1/2005 | Azami | 358/1.15 |
| 2007/0143700 | A1 | * | 6/2007 | Fukada | 715/768 |

FOREIGN PATENT DOCUMENTS

| JP | 2000-230808 A | 8/2000 |
| JP | 2003-244377 A | 8/2003 |
| JP | 2004-040565 A | 2/2004 |

OTHER PUBLICATIONS

Japanese Office Action (with English translation) dated Jan. 31, 2006.

* cited by examiner

*Primary Examiner*—Jerome Grant, II
(74) *Attorney, Agent, or Firm*—Buchanan Ingersoll & Rooney PC

(57) ABSTRACT

An image processing apparatus is provided comprising a scanner for scanning an original, a file transmitter for transmitting an image file of the original produced by the scanning to a specified destination, a user setting receiver for receiving a setting for the image file from a user after the start of the scanning action, and a file operator for assigning the image file with a desired user setting received by the user setting receiver after the start of the scanning action.

18 Claims, 3 Drawing Sheets

IMAGE PROCESSING APPARATUS AND IMAGE TRANSMITTING METHOD

This application claims priority under 35 U.S.C. §119 to Japanese Patent Application No. P2004-237621 filed on Aug. 17, 2004, the entire disclosure of which is incorporated herein by reference in its entirety.

BACKGROUND OF THE INVENTION

1. Field of the Invention

The present invention relates to an image processing apparatus and an image transmitting method both designed for use with an MFP (multi function peripheral) apparatus or an image reading apparatus which has a function of transmitting an image file produced by a known scanning technique to a specified destination such as Scan to FTP (file transfer protocol), Scan to HDD (hard disk drive), or Scan to SMB (server message block).

2. Description of Related Art

When an original is desired to be scanned and transmitted in a file to a specified destination, for example, by an MFP, its scanning action can start only after the a variety of settings including the read setting of resolution, density, and reading size for scanning, the setting of a transmission method and a destination for transmission, and the setting of a file name of the original (referred to as an image file name hereinafter) are completed at every scanning job by a user.

As the scanning action does not start before the setting of, e.g., an image file name is completed by the user, its start will be delayed by a considerable length of time.

For compensation, a technique has been introduced as disclosed in Japanese Unexamined Patent Publication No. 2003-244377 where the image file name of data scanned by an MFP is automatically generated from the data or setting of the scanning but not by the user.

More particularly, the prior art technique provides a dummy file which contains a group of setting data of original size, color modes, resolution, and data format and when the dummy file is assigned, allows the scanning action to be carried out according to the setting data of the dummy file and its scanned data to be saved as an image data file assigned with the name of the dummy file.

As the image data file is automatically produced by the MFP, its name sounds mechanical and may fail to represent the content. It will hence be mandatory for the user to search the transmitted files and rename the image data file so that its new name represents the content.

Also, while the user needs not to carry out the setting of the file name before the scanning, it has to wait in idle at the front of the MFP until the scanning is finished and the original is ready to be brought back. Alternatively, the user has to wait at the front of the MFP until it confirms that the transmission has been completed.

The description herein of advantages and disadvantages of various features, embodiments, methods, and apparatus disclosed in other publications is in no way intended to limit the present invention. Indeed, certain features of the invention may be capable of overcoming certain disadvantages, while still retaining some or all of the features, embodiments, methods, and apparatus disclosed therein.

SUMMARY OF THE INVENTION

The preferred embodiments of the present invention have been developed in view of the above-mentioned and/or other problems in the related art. The preferred embodiments of the present invention can significantly improve upon existing methods and/or apparatuses.

Among other potential advantages, some embodiments can provide an image processing apparatus and an image transmitting method where the scanning action can be started without the user conducting the settings and the waiting time until the scanning action is completed or the user confirms that the transmission has been completed can hardly be wasted.

Among other potential advantages, some embodiments can provide an image processing apparatus and an image transmitting method where the troublesome action of a user for retrieving the image file which has been transmitted and modifying the setting of the image file is not needed.

According to a first aspect of a preferred embodiment of the present invention, an image processing apparatus, comprises:

a scanner for scanning an original;

a file transmitter for transmitting an image file of the original produced by the scanning to a specified destination;

a user setting receiver for receiving a setting for the image file from a user after the start of the scanning action; and a file operator for reflecting the image file with a desired user setting received by the user setting receiver after the start of the scanning action.

According to a second aspect of a preferred embodiment of the present invention, an image transmitting method, comprises the steps of:

scanning the original;

transmitting an image file of the original produced by the scanning to the specified destination;

receiving a setting for the image file from the user after the start of the scanning action; and reflecting the image file with the desired user setting received after the start of the scanning action.

The above and/or other aspects, features and/or advantages of various embodiments will be further appreciated in view of the following description in conjunction with the accompanying figures. Various embodiments can include and/or exclude different aspects, features and/or advantages where applicable. In addition, various embodiments can combine one or more aspect or feature of other embodiments where applicable. The descriptions of aspects, features and/or advantages of particular embodiments should not be construed as limiting other embodiments or the claims.

BRIEF DESCRIPTION OF THE DRAWINGS

The preferred embodiments of the present invention are shown by way of example, and not limitation, in the accompanying figures, in which.

DETAILED DESCRIPTION OF THE PREFERRED EMBODIMENTS

In the following paragraphs, some preferred embodiments of the invention will be described by way of example and not limitation. It should be understood based on this disclosure that various other modifications can be made by those in the art based on these illustrated embodiments.

Figure 1:
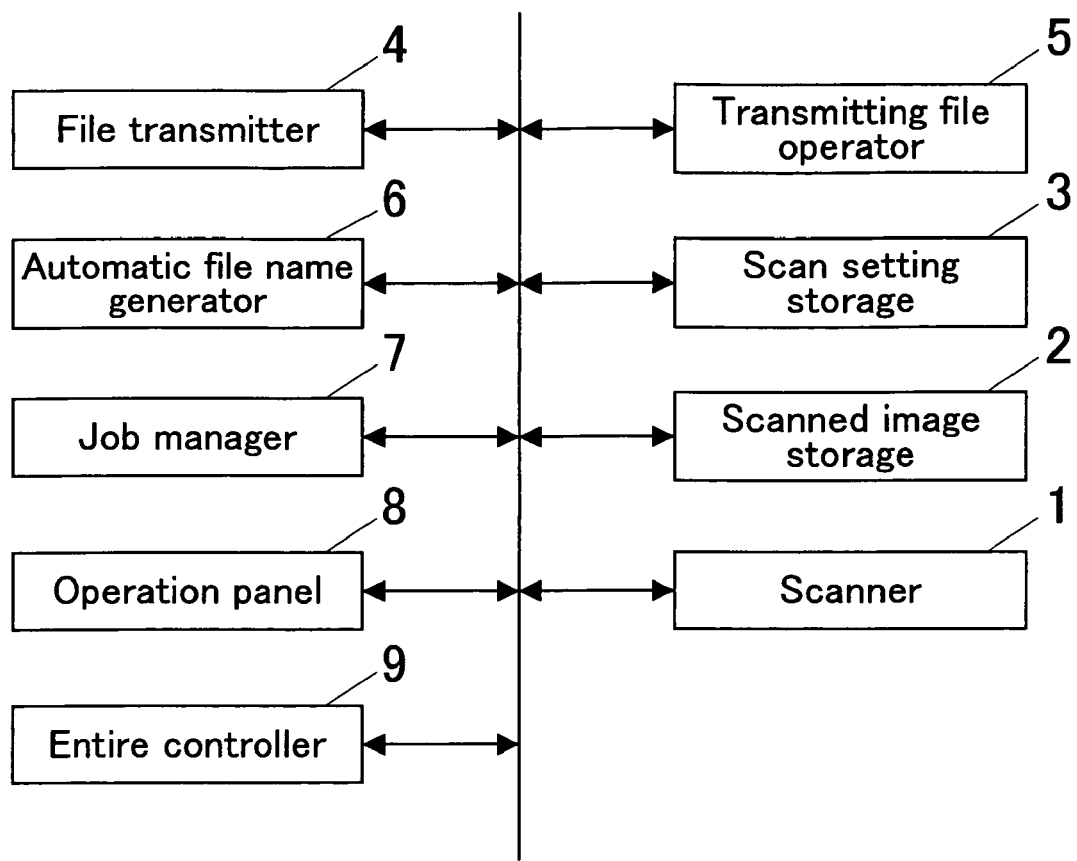
FIG. 1 is a block diagram of a schematic arrangement of an MFP in which an image processing apparatus according to one embodiment of the present invention is installed.

FIG. 1 is a block diagram illustrating a schematic arrangement of the MFP where an image processing apparatus according to one embodiment of the present invention is installed.

As shown in FIG. 1, the MFP comprises a scanner 1, a scanned image storage 2, a scan setting storage 3, a file transmitter 4, a transmitting file operator 5, an automatic file name generator 6, a job manager 7, an operation panel 8, and an entire controller 9.

The scanner 1 is provided for scanning an original placed on an original table (not shown) and releasing the image data of the original.

The scanned image storage 2 is provided as a memory for storing the image data of the original produced by scanning as the file data.

The scan setting storage 3 is provided for storing a variety of settings which are determined by the user as including the resolution, the density, and the size for scanning of the original, the transmission method and the destination for transmission of the image data of the original, and the file name and the scan job and the other job type for determining the setting action.

The file transmitter 4 is provided for transmitting the image file stored in the scan setting storage 3 to the specified destination.

The transmitting file operator 5 is provided for reflecting the file name determined by the user to the image file to be transmitted or having been transmitted. The transmitting file operator 5 is also arranged that when the image file is transmitted with the dummy file name, its attributes are designated as hidden file attributes. When the image file is received and its name is modified to a name of the user setting, the attributes of the image file are shifted to file attributes which are accessible. This will be explained later in more detail.

The automatic file name generator 6 is provided for automatically generating the dummy file name to be assigned to the image file of the original produced by scanning.

The job manager 7 controls the various jobs which comprises a scan job one by one.

Figure 2:
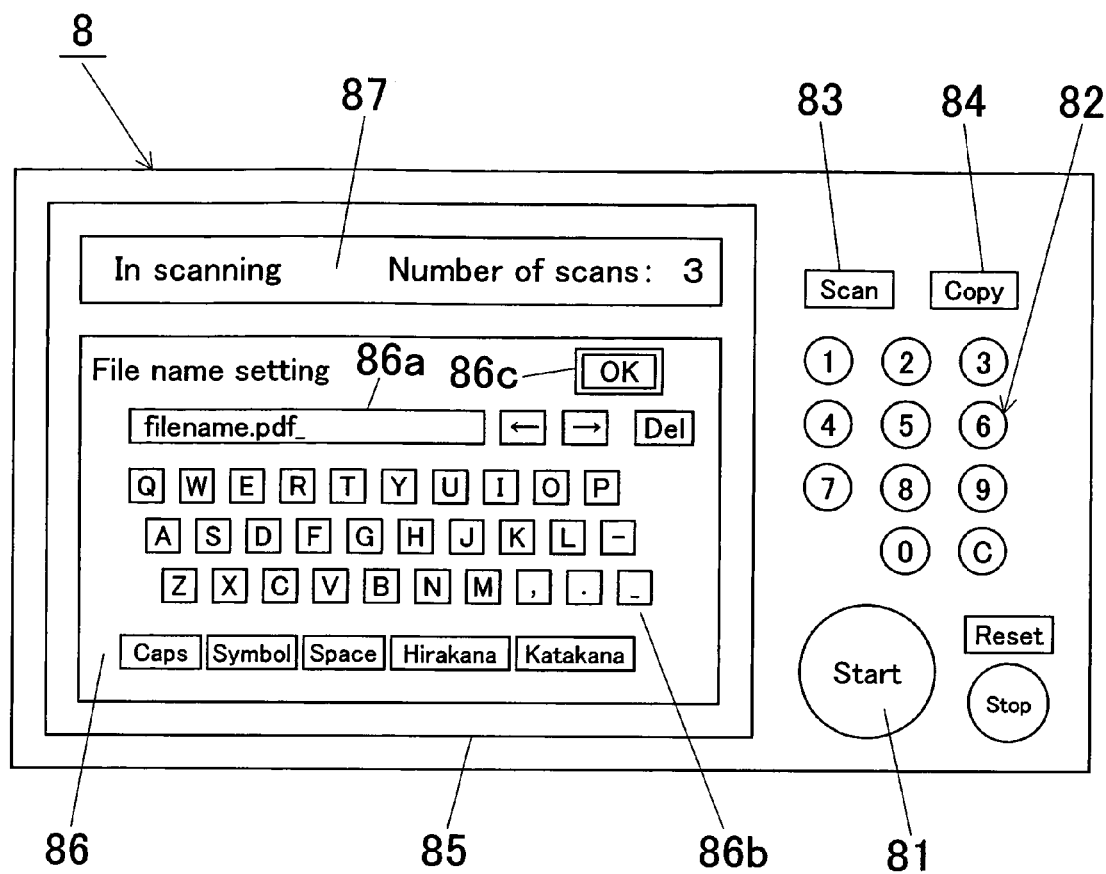
FIG. 2 is a plan view showing an operation panel of the MFP.

The operation panel 8 includes, as shown in FIG. 2, a start button switch 81, a ten key array 82, a scan button switch 83 for starting the scan mode (where the image data scanned is transmitted to the specified destination by a predetermined transmitting method), a copy button switch 84 for starting the copy mode (where an image is reproduced from the image data scanned), and a liquid crystal display 85 arranged for permitting the touch entry and displaying a setting screen 86 and an in-action screen 87.

The setting screen 86 is arranged to display a menu screen for allowing a user to conduct the scan setting and the transmission setting and a file name setting screen from which the user can determine the setting of the file name of the image file produced by the scanning action after the start of the scanning action is instructed by the user. FIG. 2 illustrates the setting screen 86 displaying the file name setting screen where a file name entry box 86a, a keyboard 86b, and an OK button switch 86c are provided. The in-action screen 87 can display an action of the MFP such as "in scanning" or "in transmission".

The entire controller 9 is provided for controlling the overall actions of the MFP. More specifically, when the scan button switch 83 on the operation panel 8 is pressed down by the user, the MFP turns to the scan mode. When the start button switch 81 is pressed down by the user having set the original on the scanner 1, the scanning action of the scanner 1 starts. Also, the controller 9 drives the job manager 7 to save the settings of the user in the scan setting storage 3, the automatic file name generator 6 to generate the dummy file name for the image file of the original produced by the scanning, and the file transmitter 4 to transmit the image file. Upon completion of the transmitting action, the controller 9 can hold or cancel the connection with the transmitted image file throughout the desired length of time.

The procedure of the MFP, shown in FIG. 1, for carrying out the file name setting and the preparation and transmission of the image file will now be described referring to a flowchart shown in FIG. 3. Each step of the procedure is denoted by S in both the description and drawings for simplicity.

Figure 3:
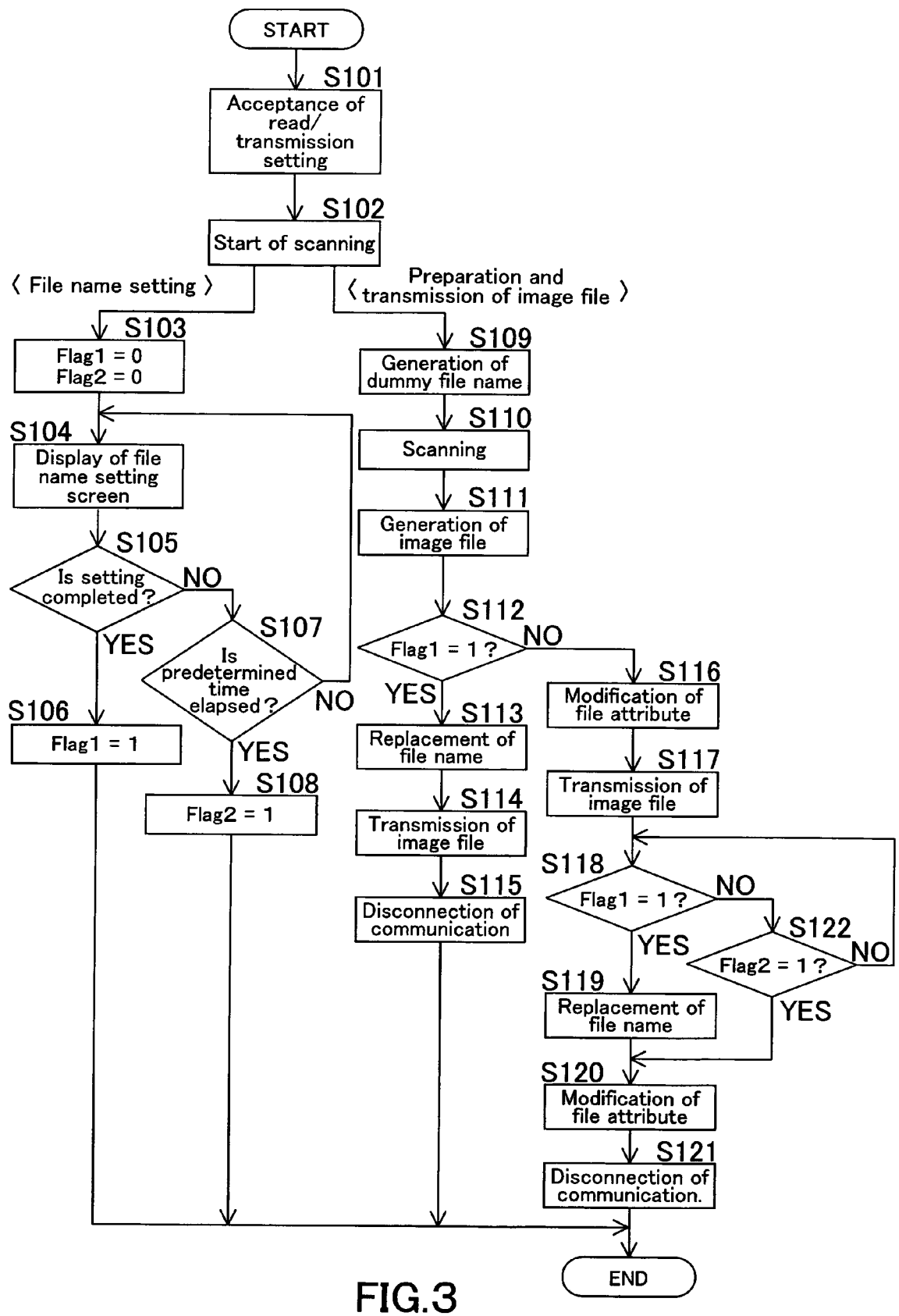
FIG. 3 is a flowchart showing a procedure of steps for the file name setting and the preparation and transmission of image file in the MFP.

As shown in FIG. 3, the procedure starts with a user depressing the scan button switch 83 on the operation panel 8 and entering from the operation panel 8 desired settings for the resolution, the density, and the size for scanning and the transmission method and the destination for transmission. In response, the entire controller 9 receives the settings of entry and save them in the scan setting storage 3 at S101. When the start button switch 81 on the operation panel 8 is pressed down by the user for commanding the start of the scanning action, the scanning action is activated at S102.

Upon the activation of the scanning action, both the file name setting and the preparation and transmission of the image file are conducted in parallel.

The file name setting starts with assigning the file name setting flag (Flag 1) to zero, Flag1=0, and the time elapsing flag (Flag 2) to zero, Flag2=0, at S103. Then, the procedure goes to S104.

At the S104, the entire controller 9 directs the operation panel 8 to display the file name setting screen on the liquid crystal display 85 of the operation panel 8 permitting the user to enter a desired file name.

The user fills the file name entry box 86a with a desired file name using the keyboard 86b of the file name setting screen 86 and when the entry is completed, presses down the OK button switch 86c.

At S105, it is examined by the entire controller 9 whether the entry of a file name is completed or not (i.e. the OK button switch 86c is depressed or not). When the entry of the file name is completed (yes at the S105), the file name is received and saved in the scan setting storage 3 and then, Flag 1 is shifted to 1 at S106 before the file setting is ended.

When the user fails to enter a file name or the entry of a file name is not completed (no at the S105), the entire controller 9 examines at S107 whether a predetermined duration of time is elapsed or not. When the duration of time has been elapsed (yes at S107), Flag 2 is turned to 1 at S108 before the file name setting is ended. If the duration of time is not elapsed (not at the S107), the procedure goes back to the S104.

On the other hand, the preparation and transmission of the image file starts with the automatic file name generator 6 automatically producing a dummy file name at S109. At S110, the original is scanned by the scanner 1 according to the settings. This is followed by S111 where the entire controller 9 prepares the image data file of the original with the dummy file name before saving them in the scanned image storage 2.

At S112, it is examined that the file name setting flag is 1 (Flag1=1) or not. When the file name setting flag is 1 (yes at S112), i.e., the entry of a desired file name has been made by the user, the transmitting file operator 5 replaces the dummy file name with the desired file name entered by the user at S113. At S114, the file transmitter 4 conducts the transmission of the image file to the destination. Finally, the entire controller 9 cancels the connection with the destination and terminates the preparation and transmission of the image file at S115.

When the file name setting flag is set with 0 (no at the S112) at the S112, i.e., the entry of the desired file name by the user is not completed, the procedure moves to S116 where the transmitting file operator 5 modifies the file attribute to the dummy file for permitting no access from a third party. At S117, the file transmitter 4 conducts the transmission of the image file to the destination. At the time, the entire controller 9 does not cancel the connection with the destination but holds the communication with the image file transmitted.

As the transmission of the image file has been completed, it is examined at S118 whether the file name setting flag is 1 (Flag1=1) or not. When the file name setting flag is 1 (yes at S117), i.e., the entry of a desired file name is completed by the user, the transmitting file operator 5 replaces the dummy file name with the desired file name entered by the user at S119 for the image file which has been transmitted to the destination remaining connected. At S120, the file attribute is modified to an accessible attribute. Finally, the communication with the destination is canceled at S121 and the preparation and transmission of the image file is ended.

When the file name setting flag is 0 at the S118 (no at the S117), the entire controller 9 examines whether the time elapsing flag is 1 (Flag2=1) or not at S120. When the time elapsing flag is 1 (yes at S120), i.e., the entry of a desired file name by the user is not completed after the duration of time, the procedure moves to S120 where only the file attribute is modified to an accessible attribute while the file name remains unchanged before the preparation and transmission of the image file is ended. When the time elapsing flag is 0 (no at S120), i.e., the duration of time is not elapsed, the procedure returns back to S118 for waiting for the entry of the desired file name by the user.

As described, the scanning action is started by the user without entering the name of the image file and after the start of scanning, the entry of the file name is conducted. When the entry of the file name is received before the image file is transmitted, the file name entered by the user is replaced with the dummy file name before the transmission of the image file. And the image file renamed with the desired file name is transmitted to the destination. When the entry of the file name by the user is not completed before the start of the transmission of the image file or it is received after the start of transmission of the image file, the name of image file which has been transmitted is replaced with the file name entered by the user. When the entry of the file name by the user is not received after the completion of the transmission of the image file, the connection to the destination remains held for a predetermined duration of time. If the entry is not received after the duration of time, the file attribute is modified before the connection is canceled.

Accordingly, the user can enter its desired file name during the scanning action or at the standby period during the transmitting action not prior to the scanning action, hence having no waste but usefulness of the time. Also, the user needs not to retrieve and rename the image file as compared with any prior art. The file name entered by the user can be reflected systematically.

Moreover, the attribute of the image file assigned with a dummy name is treated as a dummy attribute before the image file is renamed with the desired file name determined by the user. Accordingly, the image file assigned with the dummy name can be inhibited from being accessed by any other party.

The present invention is described in conjunction with but not limited to the foregoing embodiment.

For example, although the replacing of the name of the image file with the name entered by the user is conducted before or after the transmission of the image file, it may be carried out during the transmission of the image file if possible. Preferably, the image file will be renamed before or after the transmitting action.

When the image file is transmitted in an E-mail form, its file name can not be modified after the completion of the transmitting. It is hence true that the file name remains unchanged (as the dummy name) when the renaming is not conducted before the start of the transmitting action.

When the entry of the desired file name by the user is not completed before the start of the transmitting action, the renaming can be conducted after the transmission. Alternatively, there may be provided another operation mode for holding the start of the transmitting action until the entry of a desired file name is made by the user. The other mode may be provided as a default mode or when desired, selected by the user.

Although the file name entered by the user is reflected to the image file in the description, any other information may be reflected to the scanned image data with the same success.

While the present invention may be embodied in many different forms, a number of illustrative embodiments are described herein with the understanding that the present disclosure is to be considered as providing examples of the principles of the invention and such examples are not intended to limit the invention to preferred embodiments described herein and/or illustrated herein.

While illustrative embodiments of the invention have been described herein, the present invention is not limited to the various preferred embodiments described herein, but includes any and all embodiments having equivalent elements, modifications, omissions, combinations (e.g., of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to." In this disclosure and during the prosecution of this application, means-plus-function or step-plus-function limitations will only be employed where for a specific claim limitation all of the following conditions are present in that limitation: a) "means for" or "step for" is expressly recited; b) a corresponding function is expressly recited; and c) structure, material or acts that support that structure are not recited. In this disclosure and during the prosecution of this application, the terminology "present invention" or "invention" may be used as a reference to one or more aspect within the present disclosure. The language present invention or invention should not be improperly interpreted as an identification of criticality, should not be improperly interpreted as applying across all aspects or embodiments (i.e., it should be understood that the present invention has a number of aspects and embodiments), and should not be improperly interpreted as limiting the scope of the application or claims. In this disclosure and during the prosecution of this application, the terminology "embodiment" can be used to describe any aspect, feature, process or step, any combination thereof, and/or any portion thereof, etc. In some examples, various embodiments may include overlapping features. In this disclosure and during the prosecution of this case, the following abbreviated terminology may be employed: "e.g." which means "for example;" and "NB" which means "note well."

What is claimed is:

1. An image processing apparatus comprising:
   a scanner for scanning an original;
   a file transmitter for transmitting an image file of the original produced by the scanning to a specified destination;
   a user setting receiver for receiving a setting for the image file from a user after the start of the scanning action;
   a file operator for reflecting the image file with a desired user setting received by the user setting receiver after the start of the scanning action; and
   a connection holding portion for holding the connection with the image file transmitted after the transmission of the image file, wherein
   the file operator is arranged to, when the desired user setting is received by the user setting receiver after the start of the transmission of the image file, reflect the desired user setting to the image file which has been transmitted, and
   the reflection of the desired user setting of the file operator is carried out while the connection with the image file transmitted is held by the connection holding portion.

2. The image processing apparatus as recited in claim 1, wherein the file operator also is arranged to, when a user setting is received by the user setting receiver before the start of the transmission of the image file, reflect the user setting to the image file before the transmitting action.

3. The image processing apparatus as recited in claim 1, further comprising:
   a connection canceling portion for canceling the connection with the transmitted image file held by the connection holding portion,
   wherein the connection canceling portion cancels the connection with the transmitted image file held by the connection holding portion after the file operator reflects the image file with the desired user setting received by the user setting receiver.

4. The image processing apparatus as recited in claim 3, wherein in a case where the user setting receiver does not receive the desired user setting for the image file from a user within a predetermined time, the connection canceling portion cancels the connection with the transmitted image file held by the connection holding portion.

5. The image processing apparatus as recited in claim 1, wherein the file operator is arranged, while the connection holding portion holds the connection with the image file, to modify an attribute of the image file to a hidden attribute which permits no access from a third party.

6. The image processing apparatus as recited in claim 1, wherein the desired user setting is a file name of the image file.

7. The image processing apparatus as recited in claim 6, wherein when the desired user setting is received after the start of the transmission of the image file, the desired user setting is reflected to the image file which has been transmitted.

8. An image processing apparatus comprising:
   a scanner for scanning an original;
   a file transmitter for transmitting an image file of the original produced by the scanning to a specified destination;
   a user setting receiver for receiving a setting for the image file from a user after the start of the scanning action; and
   a file operator for reflecting the image file with a desired user setting received by the user setting receiver after the start of the scanning action, wherein
   the desired user setting is a file name of the image file, and
   the image processing apparatus further comprises an automatic file name generator for automatically generating a dummy file name for the image file, wherein
   the file operator assigns the dummy file name to the image file before the file operator reflects the image file with the desired user setting.

9. The image processing apparatus as recited in claim 8, wherein when the desired user setting is received after the start of the transmission of the image file, the desired user setting is reflected to the image file which has been transmitted.

10. An image transmitting method comprising the steps of:
    scanning an original;
    transmitting an image file of the original produced by the scanning to a specified destination;
    receiving a setting for the image file from a user after the start of the scanning action;
    reflecting the image file with a desired user setting received after the start of the scanning action; and
    holding a connection with the image file transmitted after the transmission of the image file, wherein
    when the user setting is received after the start of the transmission of the image file, the desired user setting is reflected to the image file which has been transmitted, and
    an assignment of the user setting is carried out while the connection with the image file transmitted remains held.

11. The image transmitting method as recited in claim 10, wherein when a user setting is received before the start of the transmission of the image file, the user setting is reflected to the image file before the transmitting action.

12. The image transmitting method as recited in claim 10, further comprising:
    a step of canceling the connection with the image file transmitted,
    wherein the connection with the transmitted image file is canceled after reflecting the image file with the desired user setting.

13. The image transmitting method as recited in claim 12, wherein in a case where the desired user setting is not received within a predetermined time, the connection with the transmitted image file is canceled.

14. The image transmitting method as recited in claim 10, wherein the desired user setting is a file name of the image file.

15. The image transmitting method as recited in claim 14, wherein when the desired user setting is received after the start of the transmission of the image file, the desired user setting is reflected to the image file which has been transmitted.

16. The image transmitting method as recited in claim 10, wherein an attribute of the image file is modified to a hidden attribute, while the connection with the image file is held.

17. An image transmitting method comprising the steps of:
    scanning an original;
    transmitting an image file of the original produced by the scanning to a specified destination;
    receiving a setting for the image file from a user after the start of the scanning action; and
    reflecting the image file with a desired user setting received after the start of the scanning action, wherein the desired user setting is a file name of the image file, and the method further includes a step of automatically generating a dummy file name for the image file, wherein the dummy file name which has been generated by the generating step is assigned to the image file before reflecting the image file with the desired user setting.

18. The image transmitting method as recited in claim 17, wherein when the desired user setting is received after the start of the transmission of the image file, the desired user setting is reflected to the image file which has been transmitted.

* * * * *

UNITED STATES PATENT AND TRADEMARK OFFICE
CERTIFICATE OF CORRECTION

PATENT NO.         : 7,602,535 B2                                    Page 1 of 1
APPLICATION NO. : 11/023619
DATED              : October 13, 2009
INVENTOR(S)        : Tomo Tsuboi It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1240 days.

Signed and Sealed this

Fifth Day of October, 2010

David J. Kappos
*Director of the United States Patent and Trademark Office*